(12) United States Patent
Firstbrook

(10) Patent No.: US 6,276,299 B1
(45) Date of Patent: Aug. 21, 2001

(54) COMBINED CONTAINER AND DRINKING VESSEL

(75) Inventor: Keith Firstbrook, Kingswinford (GB)

(73) Assignee: Firstbrook & Doman LTD, West Midlands (GB)

( * ) Notice: Subject to any disclaimer, the term of this patent is extended or adjusted under 35 U.S.C. 154(b) by 0 days.

(21) Appl. No.: 09/663,821

(22) Filed: Sep. 15, 2000

(30) Foreign Application Priority Data

Sep. 16, 1999 (GB) .................................................. 9921982

(51) Int. Cl.[7] .......................................................... A01K 7/00
(52) U.S. Cl. .............................................. 119/74; 222/205
(58) Field of Search ................................. 119/74, 51.01, 119/71, 72, 61, 652, 602; 222/92, 94, 95, 96, 192, 633, 205–207; 220/4.26, 4.27, 501, 705, 708, 710, 23.83

(56) References Cited

U.S. PATENT DOCUMENTS

| | | | |
|---|---|---|---|
| 3,246,807 | * | 4/1966 | Micallef . |
| 3,874,561 | * | 4/1975 | Zackheim et al. .................... 222/207 |
| 4,091,965 | * | 5/1978 | Gebhard ............................... 222/192 |
| 4,146,154 | * | 3/1979 | Mastman .............................. 222/109 |
| 4,581,021 | * | 4/1986 | Landau et al. ....................... 604/212 |
| 4,830,222 | * | 5/1989 | Read ..................................... 222/106 |
| 5,809,935 | * | 9/1998 | Kolterman et al. .................... 119/74 |
| 5,992,702 | * | 11/1999 | Shapiro ................................ 222/205 |

\* cited by examiner

Primary Examiner—Thomas Price
(74) Attorney, Agent, or Firm—Malcolm B. Wittenberg

(57) ABSTRACT

A combined container and drinking vessel comprises (i) a closable container (10) adapted, in use, to contain a liquid and having two opposed major surfaces (11, 12), one of said major surfaces (11) being substantially planar and the opposed surface (12) containing a dished portion (13), the container moreover having at least one resiliently deformable portion (21);

(ii) communication means extending between the interior of the container (10) and the dished portion (13) and adapted, in use, to permit a flow of liquid from the container (10) and into the dished portion (13). In use, the container (10) is at least partly filled with a liquid and deformation of the resiliently deformable portion (21) forces said liquid, via the communication means (ii) into the dished portion (13).

13 Claims, 1 Drawing Sheet

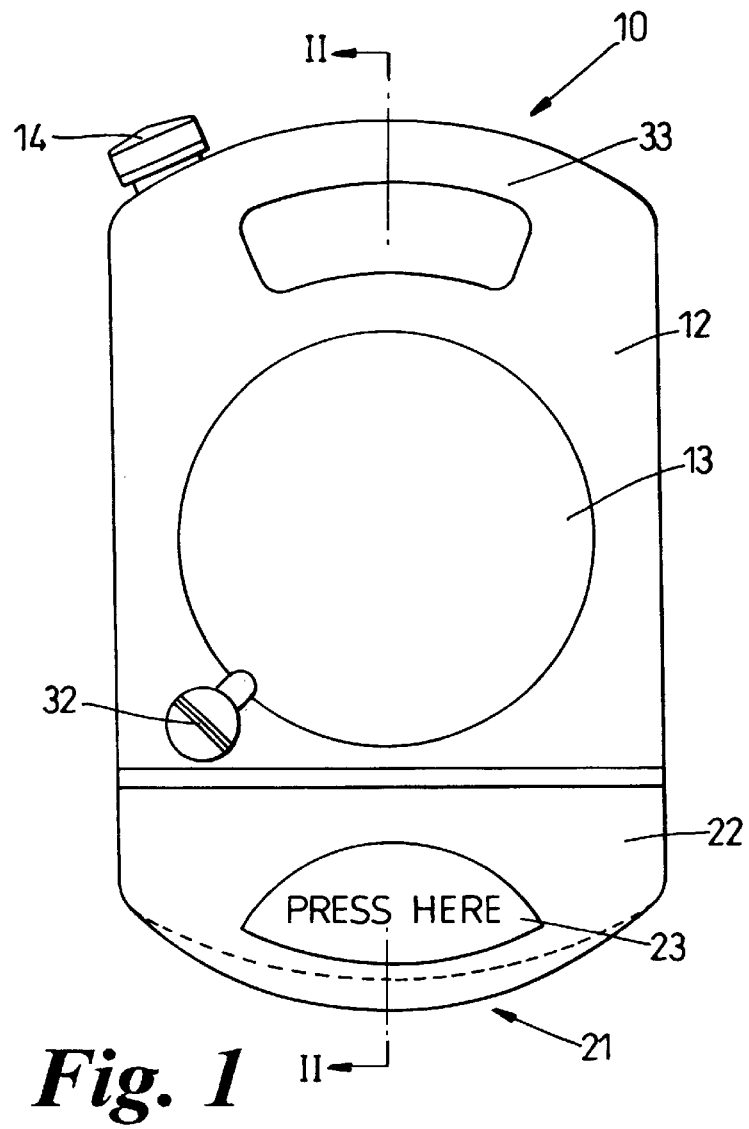
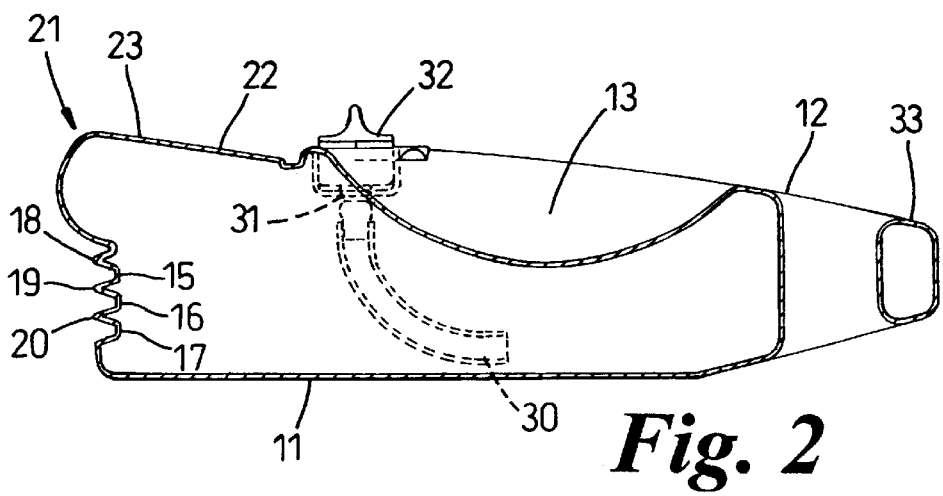

COMBINED CONTAINER AND DRINKING VESSEL

This invention relates to a device which, in use, is adapted to act as a combined container and drinking vessel and especially to such a device which can be used to provide for the needs of an animal (such as a dog) during the course of a journey.

The present invention will be described herein with particular reference to a combined water-container and drinking vessel for a dog, although it is not to be construed as being limited thereto.

When taking a dog on a journey, it has hitherto been necessary to provide a drinking bowl for the dog, together with a separate container for water. Furthermore, when providing the dog with water to drink under these conditions, it has been necessary to find a relatively level place for the bowl, open the container, pour water into the bowl and close the container. If required, the bowl then may need to be refilled from the container. When continuing the journey, both container and bowl must be retrieved and transported.

The Applicant has devised a combined container and drinking vessel which, in use, substantially avoids the above-mentioned disadvantages.

Accordingly, the present invention provides a combined container and drinking vessel comprising:
(i) a closable container adapted, in use, to contain a liquid and having two opposed major surfaces, one of said major surfaces being substantially planar and the opposed surface containing a dished portion, the container moreover having at least one resiliently deformable portion;
(ii) means communicating between the interior of the container and the dished portion and adapted, in use, to permit a flow of liquid from the container and into the dished portion.

In use, deformation of the resiliently deformable portion compresses the volume of the enclosed container (i) and forces liquid, via the communication means (ii) into the dished portion.

Preferably, the enclosed container (i) is moulded from a deformable plastics material.

The resiliently deformable portion (which conveniently is integrally-moulded with the container and forms part of the container) may suitably be provided with a plurality of grooves or other indentations to facilitate deformation. Preferably, the grooves may be further defined by integrally-moulded ribs or other protuberances, so that the resiliently deformable portion of the container (i) acts in the manner of a "living hinge".

In a particularly preferred embodiment of the present invention, the resiliently deformable portion is located at one end of the container (i) and is operated by downward pressure on the surface of the container (i)which includes the dished portion and which, in use, will be uppermost. The surface of the container (i) used to operate the resiliently deformable portion may be provided with a portion adapted to be engaged by a hand or foot of a user.

The container (i) is provided with a filling orifice which may be closed by means of a screw-cap or the like, in a manner known per se.

The communication means (ii) may suitably comprise a pipe or tube which, in use, extends from a position within the container (i) and below the normal level of the liquid to a point outside the container (i) and in proximity to the dished portion.

Preferably, the tube may be secured in position by means of a grommet or the like.

Preferably, the end of the tube adjacent the dished portion is provided with means to control the flow of liquid through the tube, such as a tap, a cock or a valve (e.g. a non-return valve).

In use, the container (i) is filled with water via the filling orifice, which is then closed. When it is required to provide water for an animal to drink, the device is placed on the ground with the dished portion uppermost. The tap or cock (where fitted) is opened and the resiliently deformable portion of the container (i) is compressed by means of the hand (or foot) of a user. Water is forced from the container, via the tube, into the dished portion, from which the animal can then drink.

The device according to the present invention provides a convenient means for transporting water and dispensing it for an animal (e.g. a dog) to drink. It may conveniently be made of a plastics material having a generally smooth outer surface (for hygiene, ease of cleaning and safety). Moreover, the weight of the water in the enclosed container (i) provides a means of enhancing the stability, in use, of the device.

A device according to the present invention will be illustrated, merely by way of example, in the following description and with reference to the accompanying drawings.

In the drawings (wherein like numerals denote like parts):

FIG. 1 is a plan view of a device according to the present invention;

FIG. 2 is a section on line II—II of FIG. 1.

The device comprises an enclosed container 10 having two opposed major surfaces 11 and 12. The surface 12 (which in use will be uppermost) is provided with a dished portion 13. The container is provided with a filling orifice closable by means of a screw-cap 14. Grooves, 15, 16 and 17, defined by ribs 18, 19 and 20, constitute the resiliently deformable portion 21 of the container. The part 22 of the surface 12 is provided with a generally flat portion 23, which in use may be engaged by a hand or foot of a user.

A tube 30 extends between the interior of the container 10 and the dished portion 13. The tube 30 is held in place by means of a grommet 31 and, at its end adjacent the dished portion 13, is provided with a tap 32.

The container 10 is moulded in one piece from a plastics material and is provided with a handle 33.

In use, the container 10 is filled with water and the filling orifice closed by means of screw-cap 14. The container is placed with its major surface 11 on the ground and the dished portion 13 uppermost. The tap 32 is opened and the resiliently deformable portion 21 is operated by downward pressure on the flat portion 23, Water is forced through the tube 30 into the dished portion 13. After use, the tap 32 is closed and the device carried away by means of the handle 33.

What is claimed is:

1. A combined container and drinking vessel comprising:
   (i) a closable container adapted, in use, to contain a liquid and including two opposed major surfaces, one of said major surfaces being substantially planar and the opposed surface containing a dished portion, said container moreover including at least one resiliently deformable portion;
   (ii) communication means extending between the interior of said container and said dished portion and adapted, in use, to permit a flow of liquid from said container and into said dished portion.

2. The combined container and drinking vessel of claim 1, in which said container (i) is at least partly filled with a liquid and deformation of said resiliently deformable portion forces said liquid, via said communication means (ii) into said dished portion.

3. The combined container and drinking vessel of claim 1, in which said container (i) is made from a resiliently deformable plastics material.

4. The combined container and drinking vessel of claim 1 in which said resiliently deformable portion is integrally moulded with said container and forms part of said container.

5. The combined container and drinking vessel of claim 4, in which said resiliently deformable portion is provided with a plurality of grooves or other indentations to facilitate deformation.

6. The combined container and drinking vessel of claim 5, in which each said groove is defined by integrally-moulded ribs or other protuberances, whereby said resiliently deformable portion of the container (i) acts in the manner of a "living hinge".

7. The combined container and drinking vessel of claim 1, in which said resiliently deformable portion is located at one end of said container (i) and is operated by downward pressure on that surface of said container (i) which includes said dished portion and which, in use, will be uppermost.

8. The combined container and drinking vessel of claim 7, in which said surface of said container (i) including said dished portion is further provided with a portion adapted to be engaged by a hand or foot of a user.

9. The combined container and drinking vessel of claim 1, in which said container (i) is provided with a filling orifice, said orifice being adapted to be closed by means of a screw-cap or the like.

10. The combined container and drinking vessel of claim 1, in which said communication means (ii) comprises a pipe or tube which, in use, extends from a position within said container (i) and below the normal level of the liquid to a point outside said container and in proximity to said dished portion.

11. The combined container and drinking vessel of claim 10, in which the end of said tube adjacent said dished portion is provided with means to control the flow of liquid through said tube.

12. The combined container and drinking vessel of claim 11, in which said control means comprises a tap, a cock or a valve.

13. The combined container and drinking vessel of claim 12, in which said valve is a non-return valve.

* * * * *